United States Patent [19]

Knudsen

[11] Patent Number: 5,448,621

[45] Date of Patent: Sep. 5, 1995

[54] DYNAMIC REALLOCATION OF SPECTRAL CAPACITY IN CELLULAR COMMUNICATION SYSTEMS

[75] Inventor: John T. Knudsen, Scottsdale, Ariz.

[73] Assignee: Motorola, Inc., Schaumburg, Ill.

[21] Appl. No.: 100,853

[22] Filed: Aug. 2, 1993

[51] Int. Cl.$^6$ ............................................. H04Q 7/36
[52] U.S. Cl. ........................................ 379/58; 370/18;
370/84; 370/95.3; 375/205; 379/59; 379/60;
455/17; 455/33.1; 455/33.2; 455/33.4; 380/21;
502/110
[58] Field of Search ..................... 370/18, 95.3, 84;
375/1, 205; 379/56, 58, 59, 60; 455/33.1, 33.2,
33.4, 50, 56.1, 17; 380/21; 502/110

[56] References Cited

U.S. PATENT DOCUMENTS

| | | | |
|---|---|---|---|
| 3,663,762 | 5/1972 | Joel, Jr. | 379/60 |
| 3,898,390 | 8/1975 | Wells et al. | 379/59 |
| 4,144,412 | 3/1979 | Ito et al. | 179/2 EB |
| 4,434,505 | 2/1984 | Gurleber | 455/50 |
| 4,722,083 | 1/1988 | Tiro et al. | 370/95 |
| 4,783,779 | 11/1988 | Takahata et al. | 370/69.1 |
| 4,819,227 | 4/1989 | Rosen | 370/75 |
| 4,870,408 | 9/1989 | Zdunek et al. | 340/825 |
| 4,901,307 | 2/1990 | Gilhousen et al. | 370/18 |
| 5,073,900 | 12/1991 | Mallinckrodt | 375/1 |
| 5,095,531 | 3/1992 | Ito | 455/33.1 |
| 5,097,499 | 3/1992 | Cosentino | 379/59 |
| 5,111,534 | 5/1992 | Benner | 455/33.2 |
| 5,134,709 | 7/1992 | Bi et al. | 455/33.1 |
| 5,161,248 | 11/1992 | Bertiger et al. | 455/17 |
| 5,247,701 | 9/1993 | Comroe et al. | 455/33.4 |
| 5,286,694 | 2/1994 | Pettijohn et al. | 502/110 |
| 5,293,576 | 3/1994 | Mihm, Jr. et al. | 380/21 |
| 5,293,640 | 3/1994 | Gunmar et al. | 455/33.1 |
| 5,299,198 | 3/1994 | Kay et al. | 370/95.3 |
| 5,303,286 | 4/1994 | Wiedeman | 379/59 |
| 5,349,580 | 9/1994 | Hester et al. | 370/84 |
| 5,363,428 | 11/1994 | Nagashima | 379/58 |
| 5,365,571 | 11/1994 | Rha et al. | 379/59 |

*Primary Examiner*—Wing F. Chan
*Assistant Examiner*—William Cumming
*Attorney, Agent, or Firm*—Gregory J. Gorrie

[57] ABSTRACT

In a cellular communication system where satellite nodes are moving with respect to the earth's surface, frequencies and time-slots are dynamically reallocated between cells in response to demand for services. When a particular cell is at or near its capacity because of a high demand for services, or is projected to be at or near capacity, spectral capacity is reallocated from nearby cells to meet the increase in demand. The reallocation in capacity is based on both real time cell loading data and historical cell loading information based on previous experiences.

17 Claims, 6 Drawing Sheets

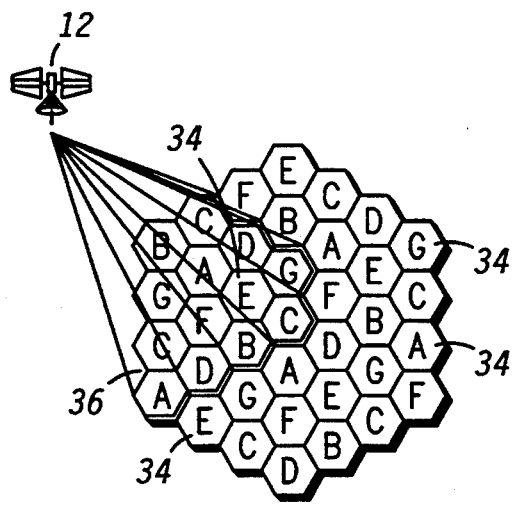
FIG. 2
FIG. 5
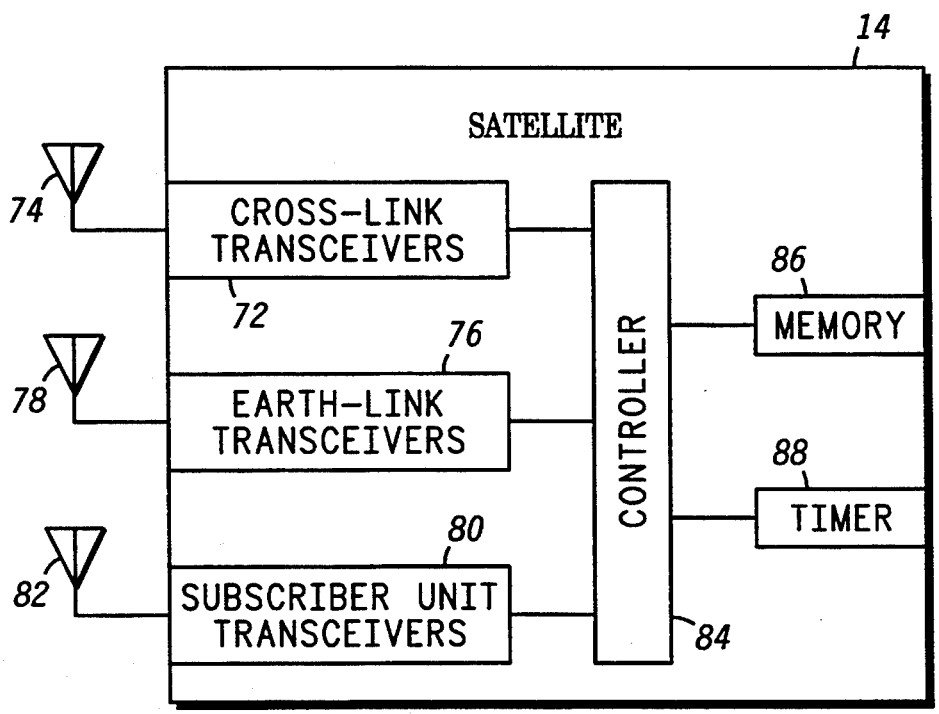

FIG. 3

TIME SLOTS

| | T1 | T2 | T3 | T4 | T5 | T6 | T7 | T8 | T9 | T10 | — | TM |
|---|---|---|---|---|---|---|---|---|---|---|---|---|
| C1 | F1 | F7 | F6 | F5 | F4 | F3 | F2 | F1 | F7 | F6 | — | — |
| C2 | F2 | F1 | F7 | F6 | F5 | F4 | F3 | F2 | F1 | F7 | — | — |
| C3 | F3 | F2 | F1 | F7 | F6 | F5 | F4 | F3 | F2 | F1 | — | — |
| C4 | F4 | F3 | F2 | F1 | F7 | F6 | F5 | F4 | F3 | F2 | — | — |
| C5 | F5 | F4 | F3 | F2 | F1 | F7 | F6 | F5 | F4 | F3 | — | — |
| C6 | F6 | F5 | F4 | F3 | F2 | F1 | F7 | F6 | F5 | F4 | — | — |
| C7 | F7 | F6 | F5 | F4 | F3 | F2 | F1 | F7 | F6 | F5 | — | — |
| C8 | F1 | F7 | F6 | F5 | F4 | F3 | F2 | F1 | F7 | F6 | — | — |
| C9 | F2 | F1 | F7 | F6 | F5 | F4 | F3 | F2 | F1 | F7 | — | — |
| C10 | F3 | F2 | F1 | F7 | F6 | F5 | F4 | F3 | F2 | F1 | — | — |
| C11 | F4 | F3 | F2 | F1 | F7 | F6 | F5 | F4 | F3 | F2 | — | — |
| C12 | F5 | F4 | F3 | F2 | F1 | F7 | F6 | F5 | F4 | F3 | — | — |
| C13 | F6 | F5 | F4 | F3 | F2 | F1 | F7 | F6 | F5 | F4 | — | — |
| C14 | F7 | F6 | F5 | F4 | F3 | F2 | F1 | F7 | F6 | F5 | — | — |
| — | — | — | — | — | — | — | — | — | — | — | — | — |
| CK | F1–FQ | F1–FQ | F1–FQ | F1–FQ | F1–FQ | F1–FQ | F1–FQ | F1–FQ | F1–FQ | F1–FQ | — | — |
| — | — | — | — | — | — | — | — | — | — | — | — | — |
| CN | — | — | — | — | — | — | — | — | — | — | — | — |

DYNAMIC REALLOCATION OF SPECTRAL CAPACITY IN CELLULAR COMMUNICATION SYSTEMS

CROSS-REFERENCE TO RELATED APPLICATIONS

This application is related to U.S. Pat. No. 5,286,694 filed on Jul. 6, 1992, and U.S. Pat. No. 5,293,576, filed on Nov. 21, 1991, and copending U.S. patent application Ser. No. 08/031,586, filed on Mar. 15, 1993, which are assigned to the same assignee as the present application.

TECHNICAL FIELD OF THE INVENTION

The present invention relates generally to communication systems. More specifically, the present invention relates to systems that divide an area within which communications are to take place into cells and which dynamically allocates limited spectral resources among the cells.

BACKGROUND OF THE INVENTION

Conventional cellular communication systems adopt a frequency reuse plan. Generally speaking, system antennas are erected at spaced apart locations. Each system antenna, along with transmitter power, receiver sensitivity, and geographical features, defines a cell. A cell is a geographical area on the surface of the earth within which communications may take place via a subscriber unit having predetermined operating characteristics and via the cell's antenna. In a cellular system that efficiently uses the spectrum allocated to it, system antennas are located to minimize overlap between their respective cells and to reduce gaps between the cells.

The spectrum allocated to a conventional cellular system is divided into a few discrete portions, typically frequency bands. Each cell is allocated only one of the discrete portions of the spectrum, and each cell is preferably surrounded by cells that use other discrete portions of the spectrum. Communications within a cell use only the discrete portion of the spectrum allocated to the cell, and interference between communications taking place in other nearby cells is minimized because communications in such nearby cells use different portions of the spectrum. Co-channel cells are cells that reuse the same discrete portion of spectrum. To minimize interference, the frequency reuse plan spaces co-channel cells a predetermined distance apart.

Communication systems almost always have a goal of efficiently using the electromagnetic spectrum allocated to them. In order to satisfy this goal, communication systems limit the opportunities for interference. Signals with significantly different frequency or timing parameters do not interfere and may easily be distinguished from one another. Likewise, a strong signal may be distinguished from a relatively weak signal having similar frequency and timing parameters. However, when generally equal strength signals having similar parameters are present, interference is possible. To reduce the likelihood of interference, a communication system often employs constraints which prevent the simultaneous presence of two substantially equal strength signals having substantially the same frequency within the system's area of coverage.

In conventional cellular systems, an area of coverage is divided into cells to efficiently use a given spectrum. Communication signals are intended to be transmitted and received within the confines of a single cell. Thus, transmission power levels are adjusted as low as possible while still insuring reliable reception within the cell. Adjacent cells are typically assigned different sections of the given spectrum so that no interference occurs between communications in adjacent cells. However, cells that are not adjacent to one another may reuse the same spectrum. Transmission power levels are sufficiently low so that no significant interference problem exists between communications taking place in non-adjacent cells.

With a satellite based cellular communication system sufficient cells can be provided to cover the entire surface of the earth. Such a system is described for example in U.S. Pat. No. 5,161,248, assigned to the assignee of the present invention, which is incorporated herein by reference.

Cellular communication systems are becoming more pervasive because they offer mobility, that is, the user may place and receive calls from anywhere in the service area and may generally move without restriction from one cell to another while using the system. However, this mobility also can create problems which do not arise in wired land-line systems. For example, users may unknowingly concentrate in a particular cell or small group of cells and cause a transient capacity overload in particular cells.

One solution to the problem of individual cell overload has been to have cells of different geographic sizes with each cell supporting a particular number of users. By making some cells smaller, users previously in those cells are now in adjacent, and hopefully, less heavily loaded cells. The change in cell size is typically accomplished by varying the power output from the transmitter for the cell, i.e., providing a lower power output for a smaller cell and a larger power output for a larger cell. This increases the total number of users that can be handled at the same time by spreading them more evenly over the available cells. Unfortunately there are limits to how small or large a cell can be made and still provide the needed communication link margin and/or avoid interfering with adjacent cells.

Another method used in the prior art to deal with individual cell overload is to temporarily assign some users or potential users who are located in the antenna overlap region near a cell periphery, from an overloaded cell into an adjacent (but overlapping) less heavily loaded cell. This method can provide some temporary relief by spreading a portion of the users to adjacent cells. No change in transmitter power is required since the overlap region exists under normal circumstances. However, the result is partly similar to the situation where the cell size is varied since those users near the periphery are shifted to the adjacent cells. This approach only provides relief in the border regions of the cell where there is overlap in the antenna coverage from immediately adjacent cells and, like the vary-the-cell-size approach, is only useful where immediately adjacent cells have unused spectral capacity.

A problem with overlap area reallocation is that the antenna patterns of adjacent cells must overlap to a significant extent in order for any significant number of users to fall within the overlap area. In general, this is detrimental to the capability and spectral capacity of each cell. The need to have antenna patterns extending greatly beyond nominal cell boundaries requires greater transmitter power and makes frequency reuse more difficult. Further, overlap reallocation may increase the number of hand-offs required during a call by a user.

The problems associated with uneven cellular loading have not been solved by spectral reuse plans. This is because the frequencies and time slot assignments to particular cells have generally been fixed at the time of construction of the system and no method has been available to vary the frequency or time slot assignments to particular cells as call loading varies.

Thus, what is needed is a cellular communication system that overcomes this limitation of the prior art by providing dynamic frequency/time slot assignment capability. Further, what is needed is the alteration in individual cell spectral capacity throughout the entire cell rather that just at the cell fringes as in prior art approaches using spectral reuse plans.

Thus, there continues to be a need for an improved method for varying the spectral capacity of individual cells in a cellular network in specific areas and at specific times to support additional users and to minimize the number of interrupted calls.

SUMMARY OF THE INVENTION

An advantage of the present invention is to provide an improved method for operating a cellular communication system. The communication system has a service area divided into a plurality of cells, each cell of the plurality has a spectral capacity and a demand for communication services associated therewith. The improved method comprises the steps of monitoring the demand for communication services within a cell of the plurality, comparing a predetermined service capacity of the cell with the demand for communication services. If the cell is at or near the predetermined service capacity, the system assigns additional spectral capacity from a nearby cell to the cell at or near service capacity in response to an increase in demand for communication services determined in the monitoring step.

The invention further provides in a preferred embodiment a method of increasing the spectral capacity of a cell in a cellular communication system in response to increases in actual demand for communication services within the cell. The cell has at least one channel transceiver associated therewith and the method comprises the steps of measuring the actual demand for communication services within the cell and comparing a predetermined service capacity of the cell with the actual demand for communication services to determine if the cell is at or near the predetermined service capacity. The improved method determines a forecasted demand for communication services by using historical cell information stored in the system to predict if additional spectral capacity will be needed and identifies at least one nearby cell. It determines an unused spectral capacity in the nearby cell by comparing a demand for communication services within the nearby cell and with a predetermined spectral capacity of the nearby cell. The improved method assigns the unused spectral capacity from the nearby cell to the cell by switching off at least one of the channel sets assigned to a nearby cell and switching on at least one of the channel sets of the cell at or near service capacity in response to the forecasted demand or the actual demand for communication services.

The invention further provides in another preferred embodiment a cellular communication system comprising a cell antenna, a cell associated with the antenna where the cell has a nominal spectral capacity and a demand for communication services associated therewith. The communication system also comprises a multi-channel transceiver for communicating with the subscriber units, the multi-channel transceiver being coupled to the antenna and a controller coupled between the multi-channel transceivers and a telephone network. The controller preferably comprises a processor capable of transferring spectral capacity to the cell at or near service capacity from an adjacent or nearby cell thereby increasing the spectral capacity of the cell when the demand for communication services approaches a predetermined level.

The invention further provides in another preferred embodiment a cellular communication system comprising a service area divided into a plurality of cells, each cell of the plurality of cells being a part of a cluster of several adjacent non-interfering cells. Each cell of the plurality of cells has an associated demand for communication services.

In another preferred embodiment, the system also comprises a phase array antenna associated with a plurality of cells, and a multi-channel transceiver for communicating with subscriber units located within the cells. The multi-channel transceiver is coupled to the phased array antenna and has capability for transmitting and receiving FDMA/TDMA waveforms located in predetermined frequency bands. The controller is coupled between the multi-channel transceiver and a telephone network such that the controller can dynamically reallocate spectrum to cells needing more spectrum.

BRIEF DESCRIPTION OF THE DRAWINGS

FIG. 2 illustrates a layout diagram of a portion of a cellular pattern formed on the surface of the earth by satellites for the communication system of FIG. 1;

FIG. 3 illustrates a typical representative Frequency Division Multiple Access (FDMA)/Time Division Multiple Access (TDMA) allocation table containing cell frequency and time slot assignments for fixed time increments;

FIG. 5 illustrates a simplified block diagram of a satellite radio communication station suitable for use in a preferred embodiment of the present invention;

DETAILED DESCRIPTION OF THE DRAWINGS

A "satellite" is defined herein to mean a man-made object or vehicle intended to orbit a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein, "spectral capacity" is defined as the number of frequencies and/or time slots available for use in a particular cell without creating interference with other nearby cells. As used herein the terms "cell" and "antenna pattern" are not intended to be limited to any particular mode of generation and include those created by either terrestrial or satellite cellular communications systems and/or combinations thereof. The term "satellite" is intended to cover both geostationary and orbiting satellites and/or combinations thereof including low earth orbiting (LEO) satellites.

Figure 1:
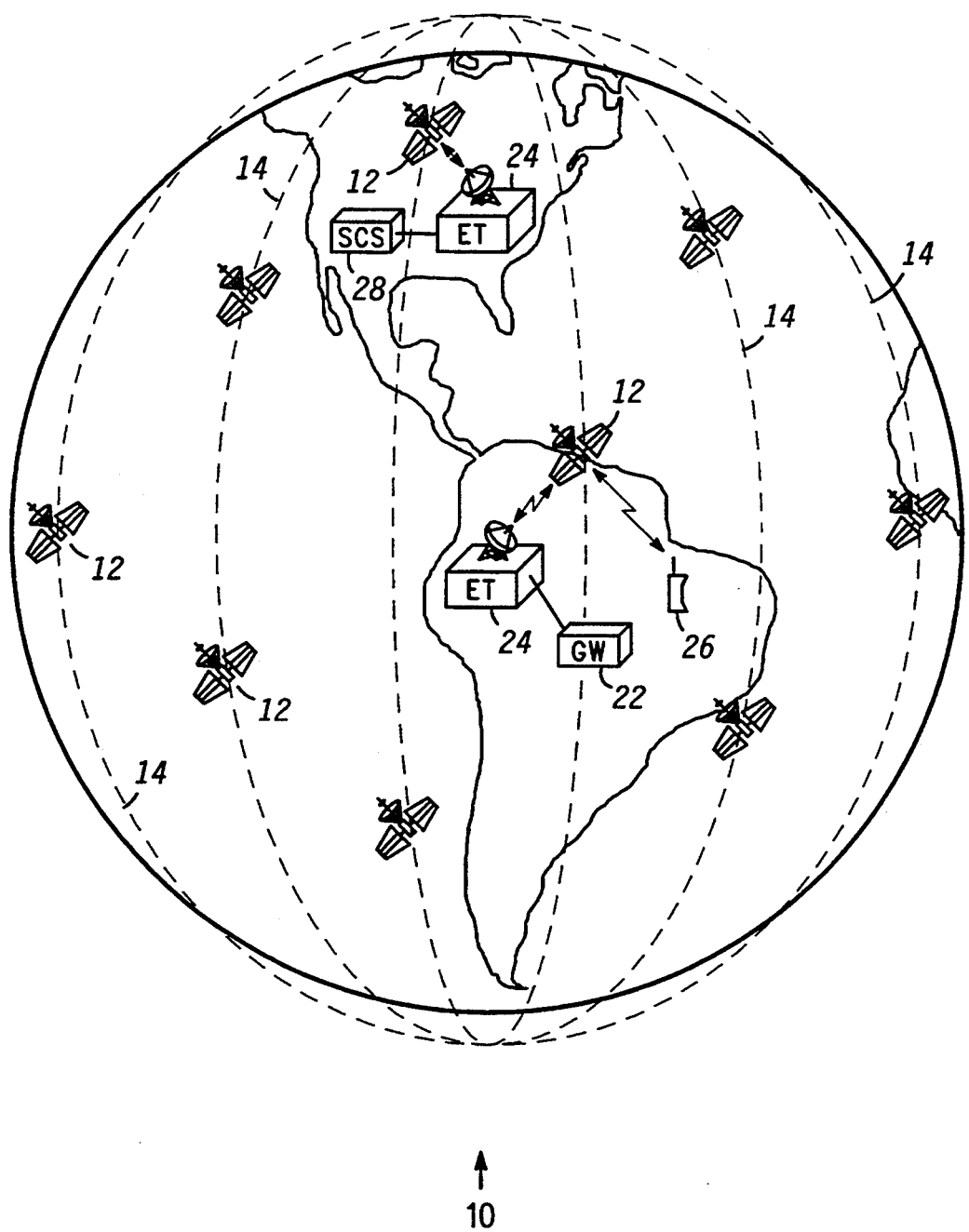
FIG. 1 illustrates a highly simplified diagram of a satellite based communication system.

FIG. 1 illustrates a highly simplified diagram of satellite-based communication system 10, dispersed over and surrounding a celestial body (e.g., Earth) through use of orbiting satellites 12 occupying orbits 14. The present invention is applicable to systems including satellites having low-Earth, medium-Earth and geosynchronous orbits. Additionally, it is applicable to orbits having any angle of inclination (e.g., polar, equatorial or other orbital pattern). Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

SCS 28 monitors the health and status of system communication nodes (e.g., GWs 22, ETs 24 and satellites 12) and desirably manages operations of communication system 10.

One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

FIG. 2 shows a typical layout diagram of a cellular antenna pattern achieved by satellites 12. Each satellite 12 includes an array (not shown) of directional antennas. Each array projects numerous discrete antenna patterns on the earth's surface at numerous diverse angles away from its satellite 12. FIG. 2 shows a diagram of a resulting pattern of cells 34 that satellites 12 collectively form on the surface of the earth. A footprint region 36, which is bounded by a double line in FIG. 2, results from the antenna patterns produced by an antenna array of a single satellite 12. Cells 34 which reside outside of region 36 are produced by antenna arrays from other satellites 12.

The precise number of channel sets into which the spectrum used by satellites 12 is divided is not important to the present invention. FIG. 2 illustrates an exemplary assignment of channel sets to cells 34 in accordance with the present invention and in accordance with a division of the spectrum into seven discrete channel sets. FIG. 2 references the seven discrete channel sets through the use of the characters "A", "B", "C", "D", "E", "F", and "G". Those skilled in the art will appreciate that a different number of channel sets, for example twelve, may be used and that, if a different number is used the resulting assignment of channel sets to cells 34 will differ from the assignment pattern depicted in FIG. 2. Likewise, those skilled in the art will appreciate that each channel set may include one channel or any number of orthogonal channels therein. As illustrated in FIG. 2, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another and do not overlap. Moreover, each subscriber unit 30 is capable of operating with any of the discrete channel sets, and the particular channel set used at any particular time by any particular subscriber unit 30 is controlled by network 12.

In Frequency Division Multiplexing (FDM) or Frequency Division Multiple Access (FDMA) systems, specified sub-bands of frequency are allocated from the communication resource (i.e. the limited electromagnetic spectrum allocated for use). In a FDM/FDMA cellular communication system each cell is assigned to one of these groups of frequencies so as to not interfere with adjacent or nearby cells. For example, in a seven frequency reuse scheme, e.g. see FIG. 2, the frequency assignments are fixed to the seven discrete channel sets noted as characters "A", "B", "C", "D", "E", "F", and "G" as previously described. The seven frequency reuse arrangement of cells helps prevent interference between cells with identical frequency assignments (i.e. co-channel cells) by separating these cells by at least two cells of different frequency assignments although it is more desirable to have only one cell separating co-channel cells.

Cellular communication systems also use Time Division Multiplexing (TDM) or Time Division Multiple Access (TDMA) where there are periodically recurring time slots during which message information of a particular user is transmitted/received. The users are assigned to particular time slots controlled by a master controller synchronized by a master clock. In reference to FIG. 2, each discrete channel set noted as characters "A", "B", "C", "D""E""F"and "G" can be assigned one time slot. Each cell can use the same frequency channel or channel set without interference because the users in each cell only receive or transmit information during their assigned time slot. Each time slot can contain one message packet (i.e., single message time slots) or can contain multiple message packets (i.e., multiple sub-time slots each containing a single message).

It is desirable to use a combination of FDMA and TDMA. For example, instead of using the same frequency channels or channel sets for a network and allocating different time slots to different cells, it is possible to rotate frequencies among the cells and assign the same or different time slot per cell. With FDMA and TDMA, some frequencies or time slots are usually reserved for access signalling and/or control, and are not ordinarily available for conventional conversations and/or user data transfer. Some channels and/or time slots of the combination FDMA/TDMA system of a preferred embodiment of the present invention are also desirably reserved for the same purpose. FDMA and TDMA communication techniques and combinations thereof are well know to those of skill in the art.

The communication resource, (i.e. limited electromagnetic spectrum) can also be partitioned by the use of a hybrid combination of FDMA and TDMA know in the art as Code Division Multiplexing (CDM) or Code Division Multiple Access (CDMA). CDMA is a spread spectrum technique where specified members of a set of orthogonal or nearly orthogonal spread spectrum codes are allocated, each using the full channel bandwidth. Two common spread spectrum techniques are direct-sequence and frequency hopping. These communication techniques are well know in the art.

Other techniques in the art for allocation of the communication resource include Space Diversity (SD) and Polarization Diversity (PD). In an SD system spot beam antennas can be used to separate radio signals by pointing in different directions. This also allows for reuse of the same frequency band. In an PD communication system, orthogonal polarizations are used to separate signals also allowing for reuse of the same frequency band. These communication techniques are also well know in the art.

While the specific communication technique (i.e. method of allocating the communication resource) in not important for the present invention, those of skill in the art will understand that any one or combination of the above described communication techniques can be used in the present invention.

FIG. 3 illustrates a representative combination FDMA/TDMA spectral capacity allocation table 40 containing cell frequency and time slot assignments for fixed time increments. Individual cells 41 are represented by cell numbers C1-CN where N is the total number of cells in the system. Individual frequencies assignments 42 are represented by frequencies F1-FQ, where Q is the total number of frequency assignments used. Individual time slots 43 are represented by time slots T1-TM, where M represents the total number time slots available. In the example of table 40, Q, the number of frequency assignments is chosen to be seven for ease of understanding. For simplicity, the channels and/or time slots used for access signalling and/or control are ignored in table 40.

The N cells can be viewed as made up of approximately N/n sub-groups or clusters of n non-interfering cells, referred to as n-cell clusters. That is, the frequencies and/or time slots within the n-cell clusters are mutually exclusive and arranged so that they will not create interference with any adjacent n-cell cluster. The factor n is also referred to as the cell "repeat pattern".

Cluster cells C1-Cn are analogous to non-interfering cells noted as characters "A", "B", "C", "D", "E", "F", and "G". In the example of the frequency reuse scheme of FIG. 2, the cluster size (n) is seven. The choices of cluster size are merely for convenience of explanation and are not intended to be limiting. Larger and smaller values of n can also be used depending upon the particular system configuration desired. When the total number of usable frequencies and/or time slots is fixed by technical or regulatory considerations, thereby fixing the capacity of each n-cell cluster, making n larger (less reuse) decreases cell-to-cell interference problems but lowers overall system capacity. On the other hand, making n smaller increases overall system capacity (more reuse, more clusters) but increases the possibility of interference between cells.

For convenience of explanation, table 40 is illustrated for the situation where Q=7 and M=10. Those of skill in the art will understand that any number of frequencies and time slots can be used, provided that there is no cell-to-cell interference. Where Q=7, the cells are conveniently represented as a collection of n-cell clusters with n=7.

The abbreviations F1-FQ, F1-F7, Fk, Fn, Fz used herein, are intended to represent (i) single frequencies, i.e., a single channel, and (ii) bands of frequencies, i.e., multiple channels (multiple sub-frequencies) assigned usually as a group, depending upon the amount of spectrum available and the system needs. Similarly, the abbreviations T1-TM, Tx, etc. used herein, are intended to represent both individual time slots and groups of time slots (e.g., multiple sub-time slots), depending upon the system capabilities and requirements.

Table 40 shows various cells 41 (i.e., particular antenna coverage locations) on the vertical (y) axis and various time slots 43 (i.e., particular time durations) on the horizontal (x) axis. Thus, table 40 presents an x-y matrix or grid in which each entry identifies the particular frequency (or group of frequencies) Fz assigned to a particular time slot Tx of a particular cell Cy. For example, time slot Tx=T4 of cell Cy=C5 is assigned frequency (or frequency group) Fz=F2. While frequencies F1-F7 are shown as being assigned in a particular fashion in table 40, this is merely for convenience of explanation and not intended to be limiting. In a preferred embodiment, the system of the present invention employs both time division multiple access (TDMA) and frequency division multiple access (FDMA).

The differences between FDMA and TDMA and their combination is readily understood by first considering them individually. For example, FDMA generally corresponds to having only one time slot (e.g., T1). Adjacent cells (e.g., C1-C7) operate without interference by each using a different frequency or sub-frequency group (e.g. F1-F7), as shown by the T1 column of table 40. The number of simultaneous calls per cell is determined by the available number Q of frequency channels per cell.

TDMA can corresponds to having only one frequency (e.g., F1) or many frequencies (e.g. F1 through F7). Adjacent cells operate without interference during different time slots (e.g., T1-TM) as shown, for example, by the diagonal entries in table 40. TDMA is possible because the information being transferred (e.g., voice and/or data) is sampled and/or compressed so that it can be transferred in brief bursts, i.e., during individual time slots, rather than continuously. For example, if a ten second speech segment from a single conversation is sampled, compressed and transmitted in a one-second time slot, then nine other conversations can be sample, compressed and transmitted during the remaining nine one-second time slots, and each of the ten original speech segments reconstructed at their respective receivers. Thus, with TDMA, the number of simultaneous calls per cell is determined by the number M of available time slots.

When both FDMA and TDMA are provided then the number of simultaneous calls that can be handled per cell is given by the product of the number of available frequencies multiplied by the number of available time slots. But, even when both FDMA and TDMA are available, uneven demand can still cause local cell overload, as described above. However, simultaneous use of TDMA and FDMA provides greater flexibility for spectral capacity reallocation.

For example, as shown in FIG. 3, the nominal spectral capacity of a cell C1 is $(Q)*(M)$ wherein Q is the number of frequencies including sub-frequencies available in each cell of the n-cell cluster of which C1 is a part and M is the number of available time slots. All other cells in the n-cell cluster also have this spectral capacity available. Thus, the total spectral capacity in the n-cell cluster is $(n)*(Q)*(M)$ and the total spectral capacity of the system is $(N)*(Q)(*M)$, assuming uniform loading.

An advantage of the present invention is the capability to assign various amounts of the total spectral capacity the n-cell cluster to a particular cell, and the other nearby or adjacent cells are left with reduced or no service when that is desirable. This is illustrated in FIG. 3 for cell Ck, wherein all available frequencies Fk=F1-FQ are available during each time slot T1-TM. Thus, when conditions warrant, the spectral capacity of a cell can be increased from its nominal or average value of $(Q)*(M)$ to a maximum of $(n)*(Q)*(M)$. Thus, if $n=7$ (e.g., see FIG. 2) and if Q =70 (e.g., 7 frequency bands F1-F7 with 10 sub-frequencies each) and M=10, the nominal spectral capacity of cell C1 is $(Q)*(M)=700$ simultaneous calls. But, by reassigning unused spectral capacity from other cells in the n-cell cluster, this can be increased to a maximum of $(n)*(Q)*(M)=4900$ simultaneous calls.

The amount of spectral capacity that can be transferred to a particular cell depends on its location relative to cells in adjacent clusters. Thus it may not be possible to use all the cluster frequencies in all the time slots because of possible interference with adjacent or nearby cells.

The explanation given above and Table 40 describe an x-y matrix of time slots and cells, with available frequencies as the matrix entries. Those of skill in the art will understand that this is merely for convenience of explanation and not intended to be limiting. The same information may be equivalently represented as an x-y matrix of frequencies and cells with available time slots as the matrix entries.

Figure 4:
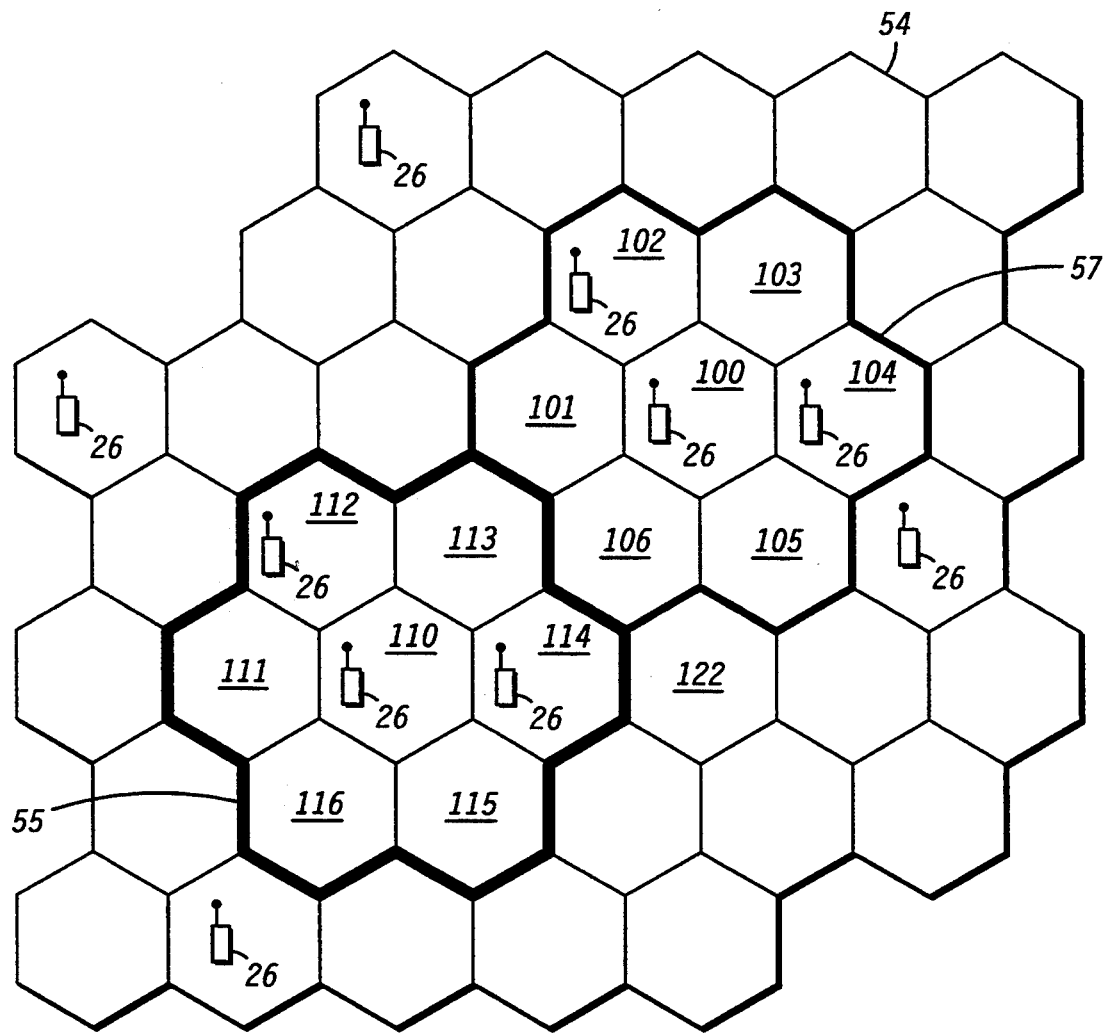
FIG. 4 illustrates a layout diagram of a portion of a cellular pattern formed on the surface of the earth for a satellite based communication system suitable for a preferred embodiment of the present invention.

FIG. 4 illustrates a geographic layout diagram of a portion of a cellular pattern 52 formed on the surface of the earth for a cellular telecommunication system suitable for a preferred embodiment of the present invention. The communication service area is divided into a plurality of cells wherein each cell 54 covers a defined and desirably contiguous geographic area indicated by geometric hexagons. The cells 54 are shown as hexagonal in shape, however, this is exemplary only. Individual cells can be formed by individual antennas or desirably by a single phase array antenna covering many cells selectively accessing specified groups of cells. Such antennas and antenna systems may be located on or the ground or near the earth's surface as well as on satellites including geostationary and low earth orbit satellites 12 (FIG. 1). For convenience of understanding, n-cell clusters 55, 57 of non-interfering cells where n=7, is highlighted. The totality of cells 52 may cover a limited region of the earth in the case of a terrestrially based cellular system or, with a satellite based cellular system, may cover substantially the entire earth. The cell pattern 54 and cell areas 52 need not be fixed in specific geographic locations and may be moving relative to the surface of the earth as in the case of a communication using orbiting satellites.

FIG. 5 shows a block diagram of a radio communication station provided by a satellite 12. Preferably, all satellites 12 within environment 10 (see FIG. 1) are substantially described by the block diagram of FIG. 5. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Moreover, subscriber unit transceivers 80 and associated antennas 82 support subscriber units 26 (FIG. 1). Preferably, each satellite 12 may simultaneously support a link for up to a thousand or more of subscriber units 26 (FIG. 1). Of course, those skilled in the art will appreciate that antennas 74, 78, and 82 may be implemented either as single multi-directional antennas or as banks of discrete antennas. It is desirable that subscriber unit antenna be a phase array antenna capable of accessing may cells 34 (FIG. 1) simultaneously.

A controller 84 couples to each of transceivers 72, 76, and 80 as well as to a memory 86 and a timer 88. Controller 84 may be implemented using one or more processors. Controller 84 uses timer 88 to maintain the current date and time. Memory 86 stores data that serve as instructions to controller 84 and that, when executed by controller 84 cause satellite 12 to carry out procedures which are discussed below. In addition, memory 86 includes variables, tables, and databases that are manipulated due to the operation of satellite 12.

Subscriber unit transceivers 80 are desirably multi-channel FDMA/TDMA transceivers capable of transmitting and receiving on all different selectable frequencies during particular, selectable, time slots as directed by controller 84. Subscriber unit transceivers 80 contains a multi-channel radios having a sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber unit transceivers 80 desirably provide for transmission and reception on any frequency channel set so that each subscriber unit transceivers 80 may, if needed, utilize the entire spectral capacity of all frequency channel sets by having the capability to handle all frequency and time slot assignments.

Figure 6:
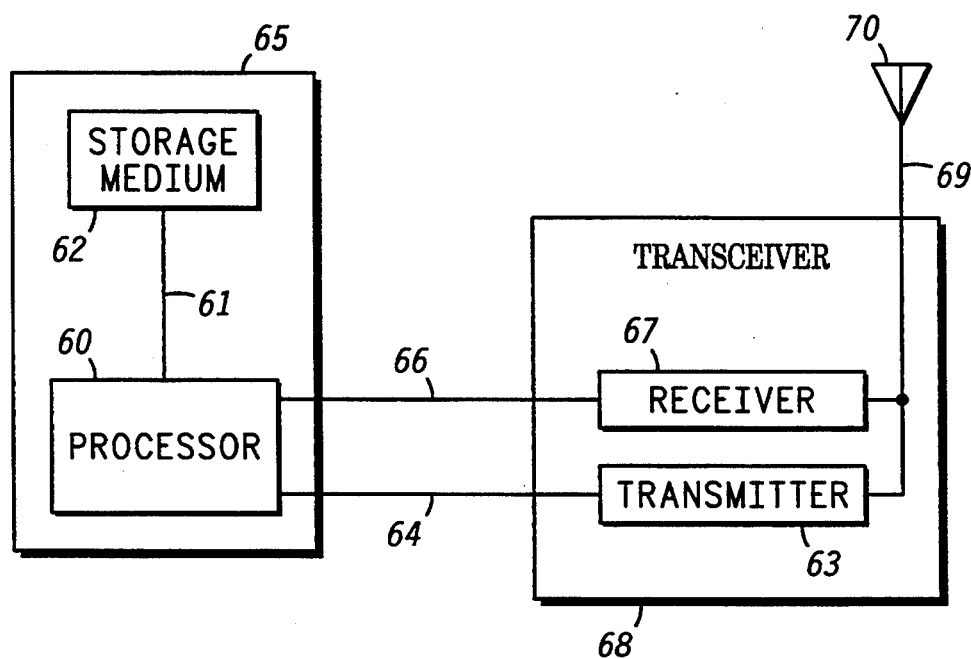
FIG. 6 illustrates a simplified block diagram of a system control station and an earth terminal suitable for a preferred embodiment of the present invention.

FIG. 6 is a simplified schematic diagram of portion 65 of a control station (e.g., SCS 28, FIG. 1) and portion 68 of a terrestrial station (e.g., ET 24, FIG. 1) in accordance with the present invention. Portion 65 includes processor 60 coupled to associated storage medium 62 (e.g., random access memory or RAM, other semiconductor or magnetic read-write memory devices, optical disk, magnetic tape, floppy disk, hard disk etc.) via link 61. Portion 68 includes antenna 70 coupled to transceiver 68 via link 69. Transceiver 68 comprises transmitter 63 and receiver 67 coupled to processor 60 via links 64 and 66, respectively. Processor 60 desirably carries out procedures exemplified in FIG. 7 and described in associated text, for example, in addition to performing other tasks as appropriate and stores results from such procedures in storage medium 62, for example. Transmitter 63 and/or receiver 67 transmit messages to and/or receive messages from satellites in accordance with visibility time intervals computed as described in connection with procedures exemplified in FIG. 7 for example.

Conventional cellular radio units and systems are described for example in U.S. Pat. Nos. 4,783,779, 4,144,412, and 5,097,499 and satellite communication systems are described for example in U.S. Pat. Nos. 4,722,083 and 4,819,227. These patents are herewith incorporated by reference. Subscriber unit antennas 82 (FIG. 5), subscriber unit transceivers 80 (FIG. 5), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

Processor 60 is operative to generally control and manage user access, message reception and transmission, channel set-up, radio tuning, frequency and time slot assignment, and other cellular radio communication and control functions not managed or provided for by controller 84 (FIG. 5). Processor 60 and/or controller 84 (FIG. 5) desirably executes procedures to reallocate cell frequency and time slot assignments using information from storage medium 62 and memory 86 in response to cell usage variations. The responsive reassignment of cell frequencies and time slots results in a dynamic reallocation of spectral capacity of the system.

By referring to FIG. 5, controller 84 desirably measures the demand of each cell 54 by measuring the number of current and queued requests for service by SUs 26 and the loading by measuring number of SUs 26 currently being served. Controller 84 and/or processor 60 desirably calculates the demand trend of each cell 54 at predetermined intervals. Processing unit 84 compares the current loading and demand information to the cell spectral capacity information in memory 86 and determines how much spectral capacity remains unused.

Controller 84 and/or processor 60 also desirably compares the current cell loading, demand and demand trend to historical cell demand. Controller 84 and/or processor 60 also desirably forecasts for each cell, whether the spectral capacity presently assigned is adequate for the immediately foreseeable demand and whether spectral capacity needs to be added or removed. The forecast is preferably based on demand trend, historical data and/or combinations thereof. If a change in spectral capacity is indicated, then controller 84 and/or processor 60 reallocates the frequency and/or time slot assignments of the cells communicating with subscriber unit transceiver 80 (FIG. 5). There is no change in the area of coverage of a cell with the reallocation of capacity. Rather, the number of frequencies and/or time slots which are active in each subscriber unit transceiver 80 (FIG. 5) are changed. SCS 28 desirably keeps track of each frequency and time slot assignment so that there is no cell-to-cell interference. In general, to prevent interference, adjacent cells cannot use the same frequency(s) in the same time slots. Furthermore, there should be at least one cell between any two cells that use the same frequency(s) in the same time slots.

Where it is desired to increase loading in a cell, the SCS 28 determines whether the adjacent or nearby cells have reported any excess spectral capacity. If the adjacent or nearby cells have any excess spectral capacity, then the SCS 28 requests priority use of frequency(s) and/or time slots assigned to adjacent or nearby cells. SCS 28 then assigns these frequency(s) and/or time slots to the needing cell and blocks use thereof by the adjacent or nearby cells until they have been released back to the donating cell. For example, referring to FIG. 4, if it is desired to increase spectral capacity of cell 106 due to an increase in demand for telecommunication services within cell 106, SCS 28 may determine if any excess spectral capacity existing in cells 113 and 114 may be reallocated to cell 106.

The historical information in storage medium 62 is generally based on actual experience of how cell loading has varied by time of day, day of week, day of month, calendar date, holidays or other special event dates, and so forth. The historical information may be generated by processor 60 or controller 84 and may also be contained in memory 86.

If desired by the system operator, controller and/or processor 60 can up-date the historical data in store 90 as new experience is accumulated. Since it is expected that most transient cell overload conditions will be repetitive, that is, likely to occur during the same hours on similar days of the week and/or month, the use of historical data to forecast changes in cell loading is of major assistance in managing spectral capacity so that changes in cell loading can be anticipated and accommodated by shifting spectral capacity from underutilized cells.

While controller 84 and memory 86 are shown as contained within satellite 12, this is not essential. The functions of the controller may also be performed on the ground by SCS 28. Further, while it is preferred that processor 60 and storage medium 62 are contained within SCS 28, this is not essential. The central processor functions and memory functions may be distributed or concentrated elsewhere in the system. For example, a master control station may be used and some or all of the monitoring and management functions described above concentrated therein. Alternatively, these monitoring and/or management functions may be distributed among various levels of the system in a hierarchical network, each level being responsible for monitoring and managing capacity assignments to/from the level below (i.e., its subordinates) and seeking from the level above (i.e., its supervisor), coordination data and capacity assignments to/from peers.

Storage medium 62 and/or memory 86 among other things desirably contains at least a set of truncated versions of table 40 (FIG. 4). These truncated tables contain the relevant information for the cells being managed by the satellite 12, each of the tables representing the historical frequency and time slot assignments for a predetermined period of time for the cells.

With the availability of historical frequency and time slot assignments keyed to clock and calendar, satellite 12 and/or SCS 28 can change cell spectral capacity to match the historical hourly, daily, weekly and/or monthly fluctuations in demand when actual demand and demand trend is not monitored. The procedure of matching historical data to demand trend alone is sufficient to provide improved service even without constant monitoring of cell loading. However, real time cell load monitoring is preferable since it acts as a check on the accuracy of the prediction based on historical trends and allows the historical trends to be constantly updated.

Further storage medium 62 may contain capacity allocation tables or assignments to provide a predetermined allocation of additional spectrum to specific cells where there would normally be a high demand for user services such as in a high population density area. For example, in Australia where there are high population density areas along costal regions, and relatively nearby low population density regions in centrally located desert or outback regions, capacity may be preallocated from the low population density regions to the high population density regions. Another example would be along the East Coast of the United States, a high population density region, which lies next to the Atlantic Ocean, where demand for cellular communication services would be low. The satellite communication system can initially allocate capacity from cells that are projected over the ocean to cells that are projected on the land area.

Figure 7:
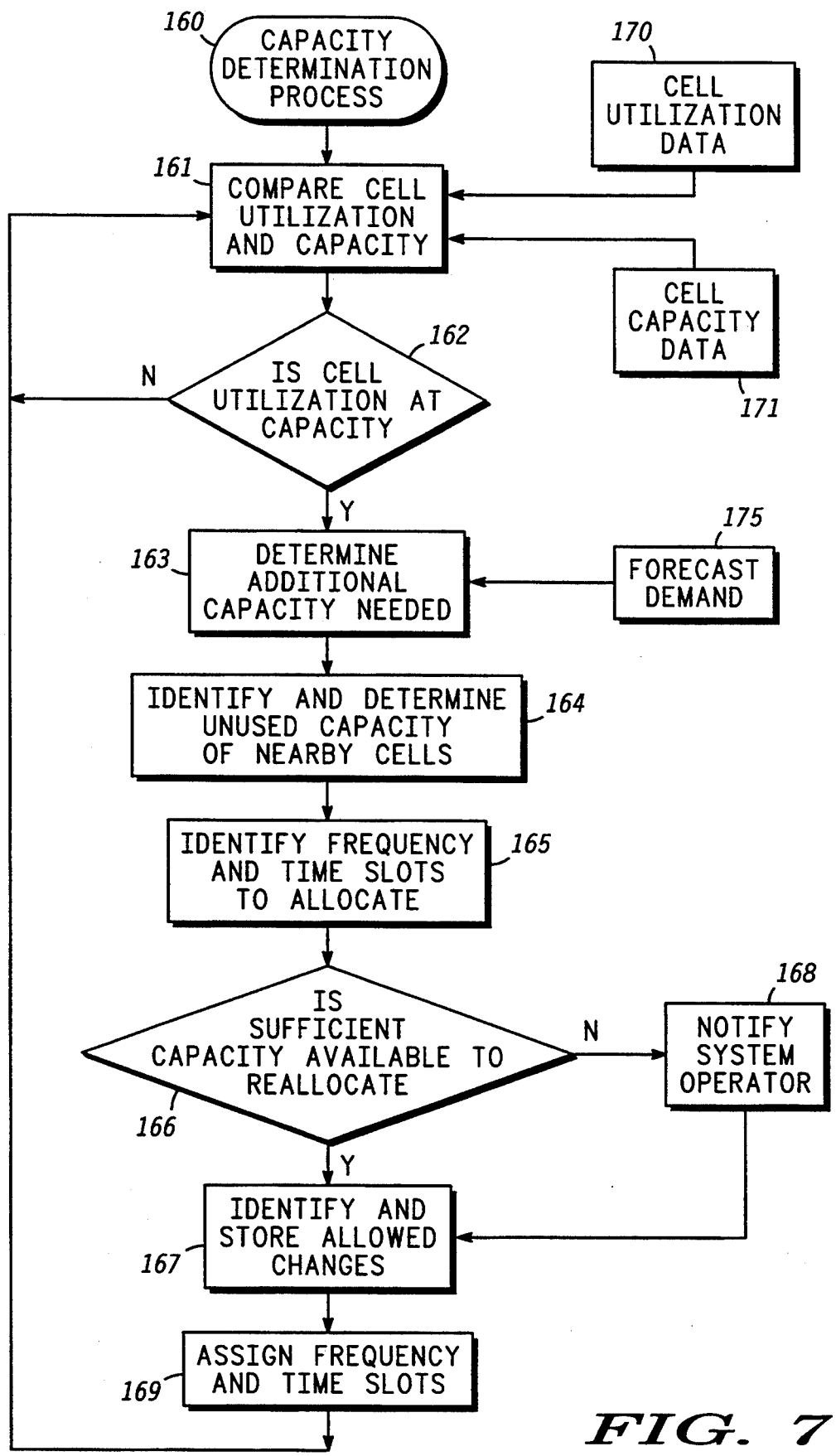
FIG. 7 illustrates a flow chart of a spectral capacity determining procedure for the allocation of frequency and time slots for an individual cell.

In a preferred embodiment of the present invention, the cellular system 10 monitors the spectral capacity and utilization of each cell as a normal business practice. FIG. 7 shows a flow chart of procedure 160 used in one embodiment of the present invention by processing unit 84. Procedure 160 is a preferred process performed either by SCS 28 or satellite 12 for determining the allocation of frequencies and time slots for cells. Procedure 160 is desirably performed on a continuous basis for each cell in the system. The term continuous includes both concurrent and serial processing on each cell.

Task 161 compares the utilization in a cell against the available resources for that cell. Cell capacity information 171 is taken from one of several storage locations such as storage medium 62 or memory 86. Cell utilization information 170 along with capacity information 171 is used by processor 60 in decision 162. If cell utilization does not approach the current available capacity of the cell, capacity determination process 160 continues to monitor cell utilization until cell capacity is approached.

If the utilization approaches or reaches the capacity of the cell, capacity determination process determines if additional spectral capacity is needed in task 163. Task 163 looks at the capacity of the cell and the demand for service. The demand for service information is obtained, for example, by knowing the capacity being used and the number of calls that have been requested but not setup, the number of calls that were interrupted, and/or the rate of change of such factors. Task 163 then computes the additional spectral capacity needed to support the demand for service. It is desirable that task 163 also utilize forecast demand information 175 to modify the results of the computation. Forecast demand information is obtained by looking at the historical cell demand information. The forecast demand information is used as an indicator as to if the capacity overload is an exception or the shifting in time of the normal communication traffic. For example, the shift to daylight saving time can cause the tables of historical data in storage medium 62 to be shifted with respect to actual demand.

Task 164 takes the identity of the cell at or near capacity and identifies the cells that are nearby. After the nearby cells are identified, the utilization and capacity of each of the nearby cells are obtained and task 164 determines which of the nearby cells has available resources to donate to the cell at capacity. It is desirable that the nearby cells with the most available capacity first be identified to donate some of their excess capacity to the cell experiencing the actual or projected demand overload. In a preferred embodiment, the decision is desirably based on historical demand information of the donor cell along the actual real time loading data. The next most desirable donor cells are then determined and the process repeats until all cells are identified in order of available resources. In another preferred embodiment, the surrounding cells are first identified.

After the cells are identified, task 165 utilizes the information about the nearby cells to identify which frequencies and time slots can be reallocated to the cell projected to be or actually at capacity. It is desirable that the capacity of the donating cell not be reduced to the point where the donating cell would be at or near capacity. The capacity reallocation must not cause frequency or time slot interference with surrounding cells. For example (referring to FIG. 4), if the cell 100 is overloaded and it has been determined that cell 103 can donate to cell 100 part or all of cell 103's time slots at part or all of cell 103's frequencies or sub-frequencies. A reallocation of spectral resources will be permitted as long as the reallocated frequencies in their respective time slots do not interfere with any cells surrounding cell 100 (i.e., cells 101–106). In this situation where the donor cell 100 is a centrally located cell of a seven cell cluster 57 which is part of a seven frequency reuse scheme, the reallocated frequencies and time slots will not normally interfere with surrounding cells when the donor cell is one of the periphery cells.

In order for the reallocation to be approved in the situation where the donor cell is not a centrally located cell, surrounding cells may be prevented from using the donated frequency-time slots to reduce or eliminate interference between adjacent cells. For example when cell 106 of cluster 57 requires additional spectral capacity and cell 114 of cluster 55 is one of the preferred donor cells, surrounding cells 100, 101, 113, 114, 122, 105 may be prevented from using the donated frequency-time slots. Cell 106 may be prevented from acquiring certain frequency-time slots from cell 114 if for example cell 100 has previously acquired frequency-time slots that would interfere with the frequency-time slots cell 106 is desiring to acquire. In this case cell 106 would be prohibited from acquiring the potentially interfering frequency-time slots. It is desirable that task 165 is repeated until enough frequency and time slots are identified to meet the need of the cell or until no more frequencies or time slots are available.

All the frequencies and time slots to be reallocated can be taken from a single cell or many cells, even all the available cells. It is desirable that the reallocation consider historical cell usage data to minimize the number of reallocations. For example, it is not desirable to take spectral capacity from a cell that will require additional capacity, above its current capacity in a short while. Information of historic cell usage stored in historical data store 90 provide this information.

Task 166 determines if there is sufficient spectral capacity available to reallocate and if this reallocation will meet the actual or projected demand. If there are not enough frequencies and time slots available to meet the demand, task 168 desirably notifies an on-line system operator (not shown) coupled to controller that a system overload is occurring or is about to occur.

Once all the available needed frequencies and time slots are identified, task 167 stores the identified frequency and time slot information identified from task 165 for updating cell frequency-time slot assignments. Task 169 then assigns the available frequency-time slots needed to the cell at or near capacity.

The present invention provides a means and method whereby the spectral capacity of cells a cellular communication system can be dynamically altered in real time or near real time as a function of location and time to support changing user service demands. While the method and apparatus of the present invention are described for small cellular communication networks, this is merely for convenience of explanation and not intended to be limiting. In the case of a satellite based cellular communications system, the sum of the antenna patterns of the various antennas on the various satellites may, depending on the user's needs, cover the entire surface of the earth.

While the invention has been described in terms of specific examples and with specific preferred embodiment, it is evident that many alternatives and variations will be apparent to those skilled in the art based on the description herein, and is intended to include such variations and alternatives in the claims.

Further this increase in cell spectral capacity is available throughout the entire cell rather that just at the cell fringes as was the case with the prior art FDMA and TDMA approaches. Also, the interference problems inherent in cell size manipulation (e.g., by varying transmitter power) and/or the hand-off problems associated with re-assignment of users in the cell overlap regions, are avoided.

What is claimed is:

1. A method for operating a node of a communication system having a service area divided into a plurality of cells that is moving with respect to earth's surface, and wherein each cell of said plurality has a spectral capacity and provides coverage for a plurality of geographic regions that are associated with different orbital positions of said node, each geographic region having a demand for communication services associated therewith, said method comprising the steps of:

(a) monitoring said demand for communication services associated with a first geographic region of said plurality of geographic regions when a first cell of said plurality of cells is providing coverage for said first geographic region;

(b) comparing a service capacity of said first cell with said demand for communication services associated with said first geographic region to determine if said first cell is at or near said service capacity; and (c) assigning additional spectral capacity from a nearby cell of said plurality of cells to said first cell when said demand for communication services associated with said first geographic region is at or near said service capacity of said first cell, wherein steps (a), (b) and (c) are performed for a first orbital position of said node that is associated with said first geographic region, and wherein said nearby cell is one of several nearby cells of said plurality of cells, and wherein said method further comprising the steps of:

(d) monitoring said demand for communication services associated with a second geographic region of said plurality of geographic regions when said first cell is providing coverage for said second geographic region, said second geographic region being associated with a second orbital position of said node;

(e) comparing said service capacity of said first cell with said demand for communication services associated with said second geographic region to determine if said first cell is at or near said service capacity; and (f) assigning spectral capacity from one of said several nearby cells to said first cell when said demand for communication services associated with said second geographic region is at or near said service capacity, steps (d), (e) and (f) being performed for said second orbital position.

2. A method as claimed in claim 1 wherein said comparing step additionally comprises the step of comparing said service capacity with a forecasted demand for communication services associated with said first geographic region, said forecasted demand having been generated by measuring an actual demand for communication services associated with said first geographic region at a prior time that corresponds to a time when said first cell provides coverage for said first geographic region, and wherein said assigning step additionally includes the step of assigning spectral capacity from said nearby cell when said forecasted demand indicates that said first cell will be at or near said service capacity when said first cell provides coverage for said first geographic region.

3. A method as claimed in claim 1 wherein said comparing step further comprises the step of determining an amount of spectral capacity required by said first cell to meet said demand for communication services, and wherein Said assigning step comprises the step of assigning said amount of said additional spectral capacity from said nearby cell.

4. A method as claimed in claim 1 wherein said nearby cell is one of several nearby cells of said plurality of cells, and said method additionally comprises the steps of:
   identifying an unused spectral capacity for each of said several nearby cells in time slots of associated frequency channels; and
   verifying for each cell of said several nearby cells that no interference is created when said unused spectral capacity from said each cell of said several nearby cells is allocated to said first cell, and wherein
   the assigning step additionally comprises the step of assigning at least some of said unused spectra capacity from at least one of said several nearby cells to said first cell, wherein no unused spectra capacity exists in said first cell.

5. A method as claimed in claim 4 wherein the step of assigning additionally comprises the step of allocating said unused spectral capacity of said Several nearby cells wherein all of said several nearby cells remain below said service capacity of each of said several nearby cells as a result of said allocating step.

6. A method as claimed in claim 5 wherein the step of allocating said unused spectral capacity further comprises the step of notifying a system operator when said unused spectral capacity of said several nearby cells is insufficient to meet said demand for communication services of said first cell.

7. A method as claimed in claim 1 further comprising the steps of:
   (g) repeating steps (d), (e) and (f) for each geographic region of said plurality of geographic regions that said first cell provides coverage for during an orbit of said node; and
   (h) repeating steps (a) through (g) for a second plurality of geographic regions associated with a second cell associated with said node.

8. A method for operating a cellular communicating system having a service area divided into a plurality of cells, each cell of said plurality having a spectral capacity and a demand for communication services associated therewith, said method Comprising the steps of:
   (a) monitoring said demand for communication services within a cell of said plurality;
   (b) comparing a predetermined service capacity of said cell with said demand for communication services to determine if said cell is at or near said predetermined service capacity;
   (c) assigning spectral capacity from a nearby cell of said plurality to said cell in response to said demand for communication services determined in said monitoring step;
   (d) locating all nearby cells;
   (e) identifying an unused spectral capacity in time slots of associated frequency channels for each of said nearby cells;
   (f) verifying for each cell of said nearby cells that no interference will be created when said identified unused capacity is allocated to said cell; and
   (g) allocating at least some of said identified unused spectral capacity of at least one of said nearby cells to said cell, and
   wherein step (g) further comprises the steps of:
   (h) comparing said identified unused spectral capacity of said nearby cells to locate a first least utilized nearby cell;
   (i) reducing said identified unused spectral capacity of said first least utilized nearby cell;
   (j) locating a next least utilized nearby cell;
   (k) reducing said identified unused spectral capacity of said next least utilized nearby cell; and
   (l) repeating steps (j) and (k) until said demand for communication services is satisfied or no more identified unused spectral capacity exists in said identified nearby cells.

9. A method as claimed in claim 1 further comprising the step of repeating steps (a), (b) and (c) until said demand for communication services associated with said first geographic region is met by said additional spectral capacity.

10. A method as claimed in claim 1 wherein a portion of said plurality of cells have at least one multi-channel transceiver associated therewith, said multi-channel transceiver capable of communicating with discrete channel sets, and wherein said assigning step further comprises the step of assigning said spectral capacity from said nearby cell to said first cell, by switching off at least one of said discrete channel sets of said nearby cell and switching on at least one of said discrete channel sets of said first cell.

11. A cellular communication system comprising:
   an orbiting communication node that is moving with respect to earth's surface;
   a subscriber antenna coupled to said orbiting communication node associated with a plurality of cells, each cell providing communication services for geographic regions associated with different orbital positions of said orbiting communication node, each geographic region having an associated demand for communication services;
   a multi-channel transceiver coupled to said subscriber antenna, said multi-channel transceiver capable of transmitting and receiving orthogonal channel sets; and
   a processor linked to said multi-channel transceiver, and wherein said processor includes:
   means for measuring said demand for communication services within a first geographic region that is being serviced by a first cell during a first orbital position of said node, said first cell having a first channel set of orthogonal communication channels associated therewith;
   means for comparing a predetermined service capacity of said first cell with said demand for communication services to determine if said first cell is at or near said predetermined service capacity;
   means for identifying a second cell having a second channel set associated therewith, said second channel set being orthogonal to said first channel set;
   means for determining an unused spectral capacity in said second cell by comparing a demand for communication services within said second cell with said predetermined service capacity of said second cell; and
   means for assigning said unused spectral capacity from said second cell to said first cell by switching off a portion of said second channel set in said second cell and switching on said portion of said second channel set in said first cell.

12. A cellular communication system according to claim 11 wherein: said subscriber antenna is a phased array antenna capable of accessing many cells of said portion of said plurality of cells simultaneously, and wherein said cellular communication system additionally comprises a storage medium linked to said processor, said storage medium containing a forecasted spectral capacity that was generated by measuring an actual demand for communication services associated With said first geographic region at a prior time that corresponds to a time when said first cell provides coverage for said first geographic region, and wherein said means for assigning includes means for assigning spectral capacity from said second cell when said forecasted spectral capacity is greater than said predetermined service capacity of said first cell.

13. A communication system according to claim 12 wherein said storage medium is configured to store a set of frequency-time slot assignments for said first cell for each of said different orbital positions of said node and wherein said processor has means for controlling assignment of reception and transmission frequencies and time slots to said multi-channel transceiver, and wherein said processor hag means to maintain a predetermined separation distance between cells having non-orthogonal channel sets.

14. A cellular communication system according to claim 12 wherein said orbiting communication node is a low earth orbiting satellite.

15. A cellular communication system according to claim 11 wherein:

said means for measuring includes means for means for measuring said demand for communication services within a second geographic region when said first cell is providing coverage for said second geographic region, and wherein:

said means for comparing includes means for comparing said predetermined service capacity of said first cell with said demand for communication services within said second geographic region to determine if said first cell is at or near said predetermined service capacity.

16. A cellular communication system according to claim 15 wherein said multi-channel transceiver comprise combination multi-channel frequency division multiple access (FDMA) and time division multiple access (TDMA) transceivers capable of transmitting and receiving on different selectable frequency channels during particular selectable time slots as directed by said processor, said different selectable frequency channels comprising a plurality of sub-frequency bands comprising frequency division multiplexed (FDMA) and time division multiplexed (TDMA) waveforms.

17. A cellular communication system according to claim 16 additionally comprising a gateway linked to said orbiting communication node, said gateway performing call processing and allocation of call handling capacity with said cellular communication system, said gateway linked to a public telephone network.

* * * * *

UNITED STATES PATENT AND TRADEMARK OFFICE
CERTIFICATE OF CORRECTION

PATENT NO. : 5,448,621
DATED : September 5, 1995
INVENTOR(S) : John T. Knudsen

It is certified that error appears in the above-indentified patent and that said Letters Patent is hereby corrected as shown below:

In Claim 4, column 17, line 21, replace "spectra" with --spectral--.

In Claim 4, column 17, line 23, replace "spectra" with --spectral--.

In Claim 5, column 17, line 27, replace "Several" with --several--.

In Claim 8, column 17, line 47, replace "communicating" with --communication--.

In Claim 8, column 17, line 51, replace "Comprising" with --comprising--.

In Claim 12, column 19, line 14, replace "With" with --with--.

In Claim 13, column 19, line 31, replace "hag" with --has--.

UNITED STATES PATENT AND TRADEMARK OFFICE
CERTIFICATE OF CORRECTION

PATENT NO. : 5,448,621
DATED : September 5, 1995
INVENTOR(S) : John T. Knudsen

It is certified that error appears in the above-indentified patent and that said Letters Patent is hereby corrected as shown below:

In Claim 15, column 20, line 6, please delete "means for means for" and replace with --means for--.

Signed and Sealed this

Twelfth Day of March, 1996

Attest:

BRUCE LEHMAN

Attesting Officer      *Commissioner of Patents and Trademarks*